No. 737,686. PATENTED SEPT. 1, 1903.
C. W. WEISS.
REVERSING GEAR.
APPLICATION FILED JULY 18, 1903.
NO MODEL.

Attest:
A. N. Jesbera
Martin Roberts

Inventor:
Carl W. Weiss
by Redding, Kiddle & Greeley
Attys.

No. 737,686. Patented September 1, 1903.

UNITED STATES PATENT OFFICE.

CARL W. WEISS, OF NEW YORK, N. Y.

REVERSING-GEAR.

SPECIFICATION forming part of Letters Patent No. 737,686, dated September 1, 1903.

Application filed July 18, 1903. Serial No. 166,078. (No model.)

*To all whom it may concern:*

Be it known that I, CARL W. WEISS, a citizen of the United States, residing in the borough of Manhattan, in the city of New York, in the State of New York, have invented certain new and useful Improvements in Reversing-Gear, of which the following is a specification, reference being had to the accompanying drawings, forming a part hereof.

The object of this invention is to produce a reversing-gear which shall be compact, simple in construction, free from liability to stripping of the teeth through sudden engagement of the parts, and shall require but slight movement in either direction to effect engagement or disengagement.

The improved gear can be applied easily to shafts which are in alinement, and is particularly advantageous for marine use, since the pressure upon the parts which are in frictional engagement will be increased by the thrust of the propeller-shaft both in going ahead and in going a stern.

The invention will be more fully described hereinafter with reference to the accompanying drawings, in which it is illustrated as embodied in a convenient and practical form, and in which—

Figure 1:
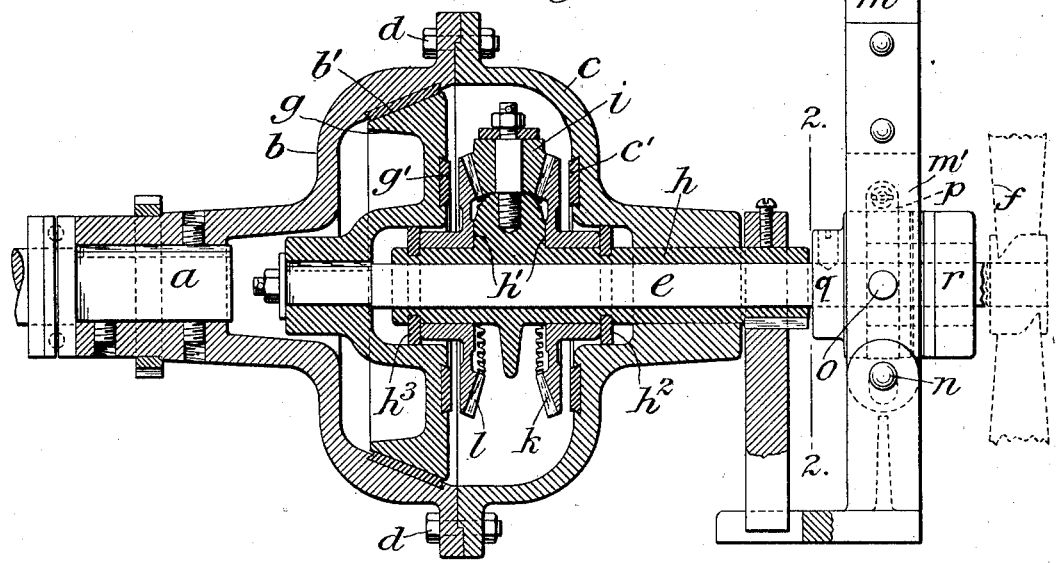
Figure 2:
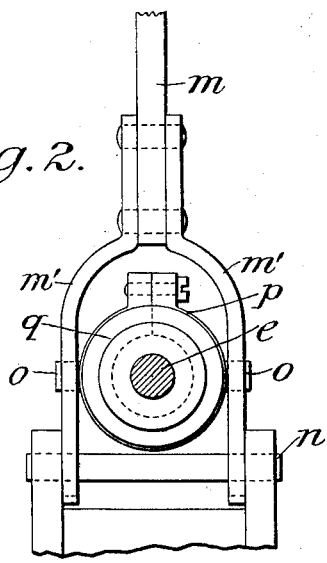

Figure 1 is a view in longitudinal central section through the gear, the two parts of the shaft and the reversing-lever being shown in elevation, with the lever partly broken out to save space. Fig. 2 is a section on the plane 2 2 of Fig. 1.

In the construction represented in the drawings the shaft $a$, which may be the main driving-shaft and may be supported in suitable bearings, has secured thereto, so as to rotate therewith, a frame or casing which is preferably composed of the two parts $b$ and $c$, adapted to be firmly secured together by any suitable means, such as the screws $d$. The other shaft or driver $e$, such as the propeller-shaft in marine uses of the invention having secured thereto the propeller $f$, is extended within the casing $b\ c$, and has fixed thereon, within the casing, a friction clutch member $g$, arranged to coöperate with a friction-band $b'$, secured within the member $b$ of the casing, which thus constitutes the second member of the friction-clutch. The shaft $e$ is movable longitudinally in its bearings to a limited extent to permit of the engagement and disengagement of the friction-clutch. Also supported within the casing, preferably by a sleeve $h$, which is mounted upon the shaft $e$, are one or more rotary transmitting devices $i$, which are preferably toothed pinions arranged to coact with corresponding bevel-gears $k$ and $l$, which are preferably mounted to rotate upon the sleeve $h$ and are adapted to engage, respectively, a friction-surface $c'$ on the casing $b\ c$ and a friction-surface $g'$ on the clutch member $g$. Shoulders may be formed upon the sleeve $h$, as at $h'$, to receive the thrust of the bevel-gears $k$ and $l$, and stop-rings $h^2$ and $h^3$ may also be secured upon the sleeve $h$ to retain the bevel-gears at all times in proper engagement with the pinions $i$.

It will be observed that the arrangement of the gears in relation to the casing and clutch member $g$ makes it possible to provide for each gear a large frictional engaging surface, thereby insuring proper driving contact when the gears are shifted in either direction.

The sleeve $h$ is held from rotation with the shaft $e$, as indicated in the drawings, and is adapted to have a limited longitudinal movement with respect to the casing $b\ c$, while the shaft $e$ is also adapted to have a limited longitudinal movement with respect to the casing $b\ c$ and the sleeve $h$. The longitudinal movement of the sleeve is effected through the longitudinal movement of the shaft, and any suitable means may be provided to effect the longitudinal movement of the latter.

As shown in the drawings, an operating-lever $m$, forked, as at $m'$, to straddle the shaft and loosely pivoted beneath the same at a fixed point, as at $n$, engages studs $o$, projecting from a collar $p$, which is clamped about the shaft $e$ between collars $q$ and $r$, fixed thereon, the shaft being thus permitted to rotate freely while under the control of the operating-lever $m$ as to its longitudinal movement.

In the operation of the improved gear when the lever $m$ is moved to the right as far as possible, carrying with it the shaft $e$, the clutch member $g$ is disengaged from the friction-surface $b'$ of the casing $b\ c$, and the friction-surface $g'$ on said clutch member $g$ is moved against the gear $l$. As the motion of the lever is continued the gear $l$, and therefore the sleeve $h$, with the pinion $i$ and the gear $k$, are also carried to the right until the gear *k* makes driving contact with the friction-surface *c'* on the casing *c*. So long as the clutch member *g* is in engagement with the friction-surface *b'* of the casing *b c* the rotation of the shaft *e* in the same direction as the rotation of the shaft *a* and at the same speed is effected through the engagement of such clutch members; but when these clutch members are disengaged and the gears *k* and *l* are brought into contact with the friction-surfaces *c'* and *g'*, as described, the driving of the shaft *e* is then effected through the gears *k* and *l* from the casing *c* to the clutch member *g*, and the direction of rotation of the shaft *e* is therefore reversed. If the gears *k* and *l* are of equal size, as represented, it will be evident that the speed of rotation of the shaft *e* when reversed will be the same as that of the shaft *a*. If the device be applied to marine propulsion, it is evident that the thrust of the screw when going ahead will increase the pressure between the clutch member *g* and the casing *b c*, insuring a sufficient driving contact, while the thrust of the screw reversed will likewise insure good driving contact between the gears *k l* and the respective friction-surfaces *c'* and *g'*. Furthermore, although the positive action of toothed gears is attained when full speed astern is reached by reason of the pressure upon the friction-surfaces exerted by the propeller it will be evident that by reason of the frictional engagement of the parts it will be possible to change direction at full speed without danger of shock or of the stripping of gear-teeth.

It will be evident that the form and proportions of the parts can be varied to meet different conditions of use without departing from the spirit of the invention.

I claim as my invention—

1. A reversing-gear comprising a frame or casing, a clutch member arranged within said frame or casing, a sleeve projected within said frame or casing, means to hold said sleeve from rotation, a transmission-pinion carried by said sleeve, freely-rotatable gears for engagement with said pinion and adapted for frictional engagement with said casing and said clutch member respectively, and means for disengaging said clutch member from said frame or casing and for effecting engagement between said gears and said clutch member and said casing respectively, substantially as described.

2. The combination of a frame or casing, a clutch member arranged within said frame or casing, independent shafts to which said parts are respectively connected, a stationary transmission-pinion, oppositely-disposed transmission-gears for engagement with said pinion and adapted for frictional engagement with said clutch member and said frame or casing respectively, and means for effecting disengagement of said clutch member from said frame or casing and for effecting frictional engagement between said gears and said clutch member and said frame or casing respectively, substantially as described.

3. The combination of a frame or casing, a clutch member arranged within said frame or casing, independent shafts to which said parts are respectively connected, a non-rotatable sleeve mounted upon one of said shafts, a transmission-pinion carried by said sleeve, transmission-gears mounted loosely upon said sleeve, for engagement with said pinion and adapted for frictional engagement with said clutch member and said frame or casing and means for effecting disengagement of said clutch member from said frame or casing and for effecting frictional engagement between said gears and said clutch member and said frame or casing respectively, substantially as described.

4. The combination of a frame or casing, independent shafts one of which is movable longitudinally, a clutch member mounted upon said longitudinal shaft within the shell or casing, a non-rotatable sleeve mounted upon said shaft and movable longitudinally therewith, a transmission-pinion carried by said sleeve, transmission-gears mounted loosely on said sleeve for engagement with said pinion and adapted for frictional engagement with said clutch member and said frame or casing, and means to shift said shaft longitudinally, substantially as described.

This specification signed and witnessed this 3d day of July, A. D. 1903.

CARL W. WEISS.

In presence of—
ANTHONY N. JESBERA,
LUCIUS E. VARNEY.